Sept. 24, 1963 W. HALPERN 3,104,661
SYSTEM FOR CONTINUOUS BLOOD PRESSURE DETERMINATION
Filed Dec. 14, 1959 4 Sheets-Sheet 1

INVENTOR
WILLIAM HALPERN
BY
ATTORNEY

United States Patent Office 3,104,661
Patented Sept. 24, 1963

3,104,661
SYSTEM FOR CONTINUOUS BLOOD PRESSURE DETERMINATION
William Halpern, New Hope, Pa., assignor, by mesne assignments, to Beckman Instrument, Inc., Fullerton, Calif., a corporation of California
Filed Dec. 14, 1959, Ser. No. 859,196
10 Claims. (Cl. 128—2.05)

The present invention relates to a system for continuously indicating and/or recording the blood pressure of a human or animal organism, more particularly to circulation monitoring or blood pressure indicating and/or recording devices of the compensating type which comprise an occluding cuff adapted for being applied to a limb or extremity and means to inflate said cuff with air or an equivalent fluid medium to suppress the blood supply through an artery. The inflating pressure of the cuff is controlled by a valve operated intermittently in response to peripheral pulse wave signals derived from a point distal to said cuff in respect to the heart by means of a suitable pulse pickup device or detector, in such a manner as to inflate the cuff to a pressure being approximately equal to the blood pressure, in the manner of an automatic feedback or servomechanism. As a result, a determination or recording of the cuff pressure by means of a suitable pressure gauge or recorder will enable a continuous indication or monitoring of the blood pressure of a patient or animal organism.

As an example, if the pickup device or detector is responsive to the tissue volume or pressure changes at the pickup point caused by the heart beats, the cuff pressure maintained by the servo system will be approximately equal to the systolic blood pressure. Alternatively, by the use of a suitable pickup and/or auxiliary means to cause the control pulses to represent the so-called arterial or Korotkoff sounds occurring at the instant of transition of the cuff pressure through the diastolic blood pressure, the latter may be indicated continually by means of a system according to the invention.

In the use of blood pressure measuring and/or recording systems of the afore-described type, more particularly for the determination of the systolic blood pressure, it has become customary to continually intermittently vary the cuff pressure above and below the systolic pressure, that is, including the periods of constant or unvarying blood pressure, in an effort, among other reasons, to allow the pressure being indicated or recorded to follow both increasing as well as decreasing blood pressure changes. There is commonly provided for this purpose a leak or escape valve connected to the occluding cuff and designed to cause a gradual decrease of the pressure in the cuff. After the cuff pressure reaches a value slightly and sufficiently below the systolic blood pressure, the pulse waves will be admitted and derived by the detector, to result in the operation of the input or inflating valve until reaching a predetermined value above the systolic blood pressure, whereby to cause a renewed occlusion of the artery or constriction of the extremity and, in turn, in an interruption of the blood flow to the detector.

In known arrangements of this type, the periodic fluctuations of the cuff pressure above and below the blood pressure have made it difficult to read and/or record the blood pressure positively and with sufficient accuracy and reliability, especially where the blood pressure is subject to substantial and rapid changes or variations or where the pulse amplitude and/or rate vary substantially in the case of a single or for different patients. This has resulted in errors of the blood pressure measurement beyond the limits or tolerances admissable for practical use and applications.

Accordingly, a principal object of the present invention is the provision of an improved continuous blood pressure indicating and/or recording system of the compensating type which substantially overcomes the previous and related difficulties and drawbacks and which will enable a blood pressure determination with increased accuracy, either systolic or diastolic, positively and reliably and with a minimum of errors.

A more specific object of the invention is the provision of a continuous blood pressure monitoring system of this type which is substantially free from errors due to variations of the pulse amplitude and which may be adapted and/or adjusted for varying pulse rates, to result in a maximum of indicating and/or recording accuracy as well as increased ease of operation.

A further difficulty and drawback of continuous blood pressure measuring or circulation monitoring devices of the type described has been the complete occlusion or restriction of the blood flow by the occluding cuff during prolonged periods. This may result in discomfort or injury to the patient and has made it necessary to restrict the indication or measurement to limited time periods. As a consequence, no indication may be available at critical moments, resulting in the defeat of the very purpose as well as advantages of continuous blood pressure monitoring or indication, especially during operations, as well as post-operative or recovering periods.

Accordingly, still another object of the invention is the provision of an occluding cuff especially designed for use in connection with continuous blood pressure measuring and/or recording systems of the type according to the invention, whereby a complete constriction or suppression of the blood flow is avoided and the measuring apparatus may be used or applied during prolonged periods, substantially without discomfort or danger to the patient.

Yet another object of the invention is the provision of a continuous blood pressure determination or monitoring system adapted for use with different patients or with the same patient throughout periods of extreme blood pressure variation, substantially without requiring readjustments and without materially impairing the measuring and following accuracy of an indicator and/or recorder of the blood pressure being determined.

A further object of the invention is the provision of continuous blood pressure measuring and/or recording apparatus which will require no change or readjustments in use when changing from one patient with a low blood pressure to one with a relatively high blood pressure, and vice versa.

Still another object of the invention is the independent or simultaneous indication and/or recording of either or both the systolic and diastolic blood pressures simultaneously from the same limb of a patient.

Another object of the invention is to generally increase the flexibility and usefulness of a continuous blood pressure monitoring system by enabling the same to be readily adapted to existing operating conditions and requirements.

The invention, both as to its auxiliary objects as well as novel aspects, will be better understood from the following detailed description of a few preferred practical embodiments, taken in reference to the accompanying drawings forming part of this specification and in which.

Like reference characters denote like parts and elements throughout the different views of the drawings.

With the foregoing objects in view, the invention involves generally the provision of means to maintain a constant adjustable rate of the rise and fall of the periodic pressure fluctuations of the occluding cuff caused by the action of the inflating input valve and the leak or escape valve, as well as to maintain substantially constant, and preferably also adjustable, rise and fall times of the cuff pressure during the fluctuation periods above and below the steady or average cuff pressure being a measure of the blood pressure being indicated and/or recorded. This results in fluctuations of substantially invariant amplitude and duration, whereby to ensure a maximum measuring or indicating accuracy, as well as increased facility or ease of direct reading of the blood pressure by the observation of the pointer of a pressure gauge or of the record upon the indicating chart or tape of a suitable pressure recording device.

There is provided for this purpose, according to the invention, a first constant flow control valve or equivalent means connected between the source of the inflating medium, such as a compressor or other supply of compressed gas or fluid, and the occluding cuff, to result in a constant rise or rate of increase of the cuff pressure, i.e., either systolic or diastolic during the opening periods of the input or inflating valve controlled by the output signals of the pulse detector, substantially independently of the pressure differential between said source and the pressure in the occluding cuff corresponding to the blood pressure being indicated and/or recorded. Similarly, a further constant flow control valve is provided between the cuff and the leak or escape valve, to ensure a constant leak rate, and, in turn, a constant fall or rate of decrease of the cuff pressure below the average pressure during the closing periods of the input or inflating valve controlled by the signals of the detector or transducer converting the arterial volume changes or sounds into corresponding changes of electric current or potential.

Finally, there is provided, according to the invention, a pulse standardization circuit to convert the electrical pulse waves or signals derived by the detector or transducer into substantially square-shaped electrical pulses having a constant amplitude and duration substantially independent of the shape and amplitude of the detected signals or pulses. The pulse standardization circuit may be in the form of a monostable or one-shot multivibrator or blocking oscillator, or any known type of gating or the like repeater circuit adapted to convert the detected irregular-shaped pulse waves or signals into pulses of constant length and amplitude. The pressure of the compressor or equivalent source of compressed air or the like is maintained sufficiently above the highest blood pressure to be recorded or indicated, in an effort to render the amplitudes of the cuff pressure fluctuations substantially constant during wide variations of the blood pressure, to further simplify the reading of the pressure being indicated and/or recorded. For practical purposes, a source pressure of about 1000 mm. Hg has been found satisfactory, that is, a pressure being about five times the highest blood pressure expected under average indicating and/or recording conditions.

By the combined cooperative effect of the constant flow control means connected between the source of compressed air or the like and the occluding cuff, on the one hand, and between the cuff and leak valve, on the other hand, as well as by the conversion of the detected pulse signals into control pulses of constant or invariant amplitude and duration, the periodic fluctuations of the cuff pressure representing the blood pressure to be determined may be equalized to an extent as to allow of a positive and easy reading of the indicated or recorded blood pressure with a minimum of errors, as well as independently of blood pressure variations within relative wide limits, as will become further apparent from the following description of a complete blood pressure monitoring system constructed in accordance with the principles of the invention.

According to an improved feature of the invention, the cuff pressure fluctuations may be smoothened or suppressed prior to their application to the indicator or recorder by means of pneumatic and/or electrical filter or smoothing means, whereby to result in a steady or continuous indication of the blood pressure. Such a system is especially suitable in such cases where only relatively slow or gradual blood pressure variations are to be expected, while in the case of relatively wide and rapid fluctuations of the blood pressure, the pulsating or intermittent operation of the indicator or recorder will result in a greater following accuracy as well as in increased operating stability, as will be further understood from the following.

Figure 1:
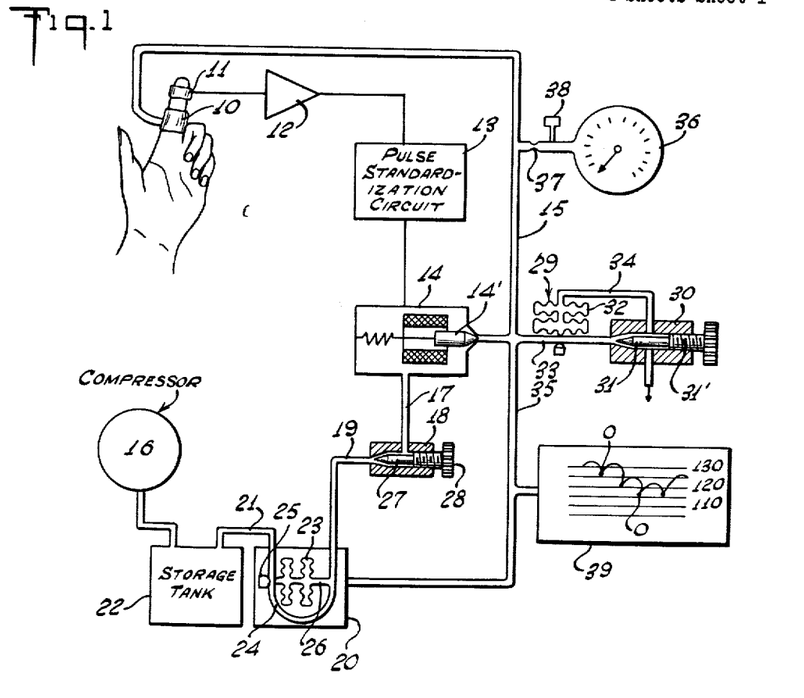
FIG. 1 is a schematic diagram, shown partly in block form, of a continuous blood pressure indicating and/or recording system especially designed for the determination of the systolic blood pressure and being constructed in accordance with the principles of the invention.

Referring more particularly to FIG. 1 of the drawings, he numeral 10 indicates a digital occluding cuff shown applied to the index finger of a patient, but which may be applied to any other limb or extremity, and item 11 represents a pulse detector or transducer arranged distal to the cuff 10 upon the same finger in respect to the heart and serving to detect arterial pulse or tissue volume changes of the finger or other extremity caused by the heart beats and to be converted into corresponding changes of electrical current or potential. As an example, the detector 11 may be in the form of a piezoelectric transducer or an infra-sonic capacitative pickup or transducer of the type disclosed by U.S. Patent No. 2,755,796, issued on July 24, 1956 to Heinz Boucke. The amplitude of the detected pulse signals $q$, FIG. 2B, is raised to a sufficient level by means of an amplifier 12 and the amplified signals applied to a pulse standardization circuit 13, such as a one-shot multivibrator to be described in greater detail hereafter, to produce final output or control pulses L, FIG. 2B, of substantially constant amplitude and duration $t_1$, FIG. 2B. The pulses L, in turn, serve to energize a solenoid or the like electrically actuatable input or inflating valve 14 which serves to regulate the supply of compressed air or the like from a source 16, such as a compressor, to the occluding cuff 10 through the conduit or feeding line 15 connected to the output side of the valve 14. The latter may consist in a known manner of a plunger 14′ forming a valve cone or needle and being controlled by a magnetic or solenoid exciting winding against the action of a return or biasing spring, as indicated in the drawing.

Connected between the line 17 to the input side of the valve 14 and the source 16 are a flow rate adjusting valve 18, a constant flow control valve 20 and a storage or buffer tank 22. The constant flow control valve is comprised, in the example shown, of a flexible metal bellows 23 and a resilient tube 24, such as of silicone rubber and connected between the inlet and outlet conduits 21 and 19 of the valve. One end of the bellows engages one side of the tube 24 opposite to an abutment 25, while the inside of the bellows is connected to the output pressure side of the valve through a tube or conduit 26. The entire valve structure is enclosed in a housing which is connected to the cuff pressure line 15 through a line or conduit 35, whereby the bellows 23 is expanded and contracted by the output pressure of the valve against a surrounding pressure equal to the pressure of the occluding cuff 10 the flow to which is to be controlled or equalized. More specifically, let it be assumed that the cuff pressure decreases relative to the pressure of the source 16 maintained constant at say about 1000 mm. Hg by any suitable means, which would result in an increased flow through the valve 14 by a multivibrator output or control pulse L will be substantially constant, as indicated by the angle α in FIG. 2B, wherein S represents the systolic blood pressure assumed to be constant and C are the fluctuations of the cuff pressure above and below the systolic value. These letters have the same significance in FIGS. 2A, 2B, 2C and 2D. Additionally, the symbol $q$ indicates the output of the detector 11 (FIG. 1), and the symbol $p$ indicates the intra-arterial pulse pressure to be measured. The periodic fall and rise of the cuff pressure is due to the action of the constant leak or escape valve 30 connected to the cuff input or feeding line 15 and being similarly fitted with a constant flow control valve 29 comprising a flexible tube 33, a bellows 32 and feedback line 34, similar to the construction of the input flow control valve 20. As a consequence, the leaking rate of the cuff pressure is kept substantially constant, as indicated by the angle β, FIG. 2B. Since in this case the leak of the cuff pressure is against the pressure of the ambient atmosphere, the bellows 32 need not be mounted in a special chamber as in the case of the bellows 23 of the input flow control valve 20.

The input flow adjusting valve 18 and the leak valve 30 may be of any suitable construction, such as of the type having a valve cone or needle 27 and 31 being adjustable by means of a thumb or set screw 28 and 31', respectively, as shown in the drawing.

FIG. 2B more clearly illustrates the special case of the pulse length $t_1$ and pulse intervals $t_2$ of the multivibrator or control pulses L being equal to one half of the total period T between two intra-arterial pressure pulses $p$, FIG. 2A, or the detected pulse signals $q$, FIG. 2B, occurring during the decrease of the cuff pressure below the systolic blood pressure between points $x$ and $y$, as shown in the drawing. In this case, the lowermost points O of the cuff pressure fluctuations C being spaced from the systolic pressure by about 1 to 4 mm. Hg, depending upon the patient, the amplifier gain, sensitivity of the pulse detector and other parameters of the system, are an approximate measure or indication of the systolic blood pressure to be determined and/or recorded.

Figure 2A:
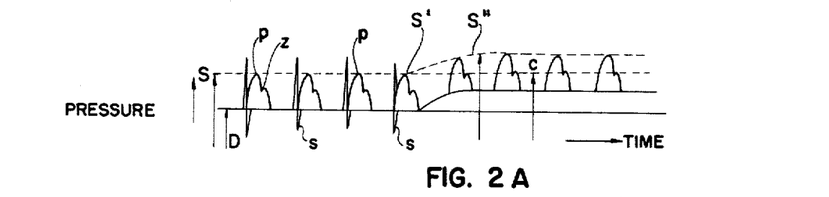
FIGS. 2A, 2B, 2C and 2D are theoretical diagrams explanatory of the function and operation of the invention, FIG. 2A representing the intra-arterial pressure fluctuating between diastolic and systolic, FIG. 2B illustrating the relationship between cuff pressure fluctuation and output control pulses, FIG. 2C illustrating the manner in which the cuff pressure follows changing systolic pressure and the resultant output control pulses, and 2D showing the relationship between the pressure rise and pressure fall rates and the resulting accuracy of measurement and following ability.
Figure 2B:
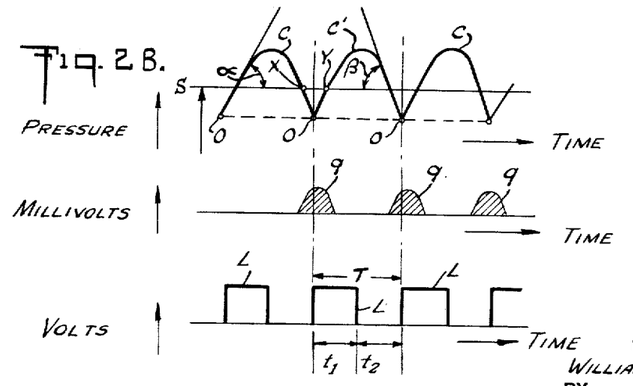

FIG. 2A more clearly illustrates the occlusion of the pulse intra-arterial pressure waves $p$ by the cuff pressure C assumed to equal the systolic blood pressure S. For practical purposes, the latter may be regarded as being above the diastolic pressure D by an amount related to the pulses amplitudes $p$. If now the systolic blood pressure increases, say from S to S", the pulse waves will rise above the cuff pressure, as shown at S', whereby to result in a detection by the pickup 11 and a periodic opening and closing of the valve 14 until the cuff pressure C has again become equal to the systolic blood pressure S", in a manner readily understood.

Figure 2C:
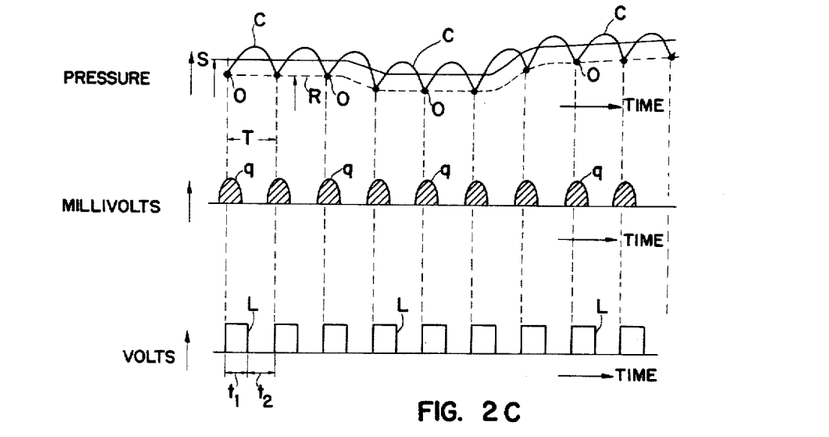

FIG. 2C illustrates the periodic rise and fall of the cuff pressure C as a result of the action of the leak valve 30, whereby to result in a series of points O upon a line R substantially following the systolic pressure S and enabling a positive and easy reading of the blood pressure instantly and continuously, in a manner readily understood from the foregoing.

Figure 2D:
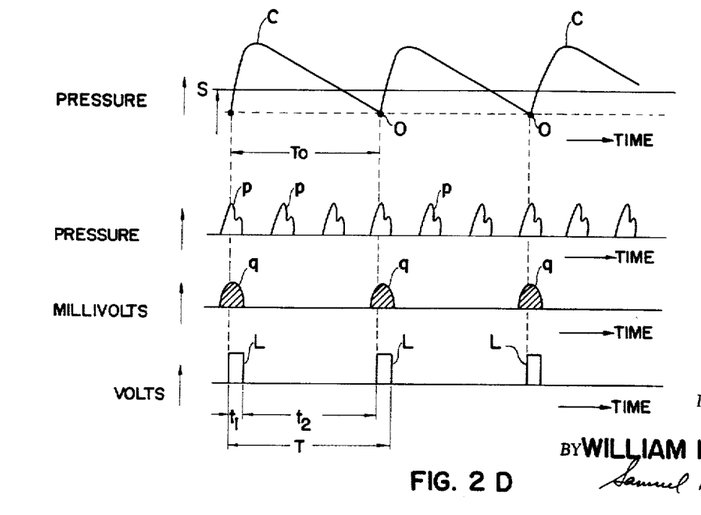

In the example illustrated in FIG. 2C, a multivibrator or control pulse L is assumed for each detected pulse signal $q$ derived by the detector 11. The length or duration of the cuff pressure fluctuations C to encompass a desired number of intra-arterial pressure pulses $p$ may be controlled by variation of the pulse width T of the multivibrator pulses L, as shown in FIG. 2D, in conjunction with the proper rise and fall rates or angles α and β determined by the adjustment of the valves 18 and 30, respectively. Thus, in FIG. 2D the cuff pressure C is shown to rise steeply during a relatively small fractional period $t_1$ of the total pulse period T and then to fall slowly and gradually during the ensuing relatively long fractional period $t_2$, in such a manner as to reach the point O below the systolic pressure S upon the occurrence of every third intra-arterial pressure pulse $p$. The greater the pressure fluctuation period $T_o$, the higher the indicating accuracy but the lower the following accuracy of the system in respect to relatively rapid blood pressure variations, and vice versa, for small fluctuation periods $T_o$. It is thus possible, according to the invention, by the proper adjustment of the valves 18 and 30 and of the multivibrator pulse width $t_1$, to adapt the system to any existing conditions and operating requirements, to thereby ensure both maximum reading accuracy as well as ease of indication and/or recording of the blood pressure to be determined.

Figure 3:
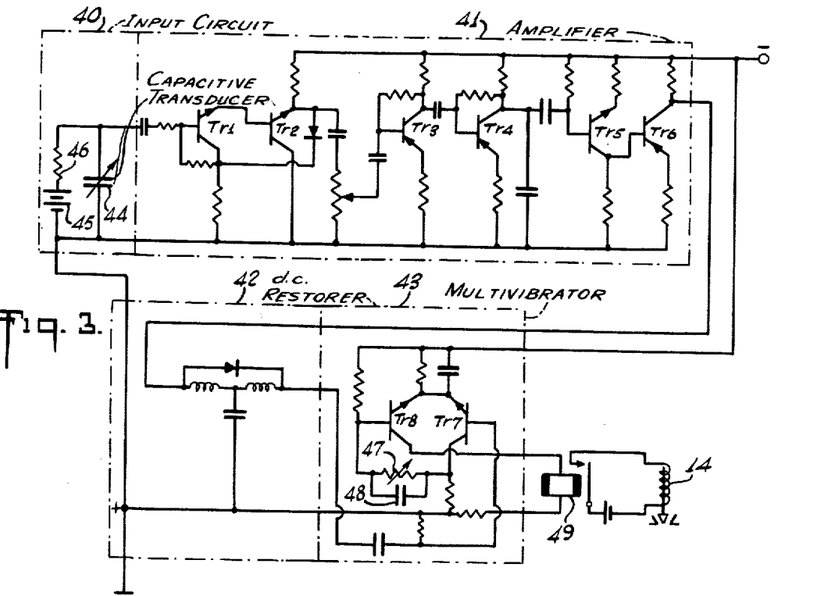
FIG. 3 is a more detailed circuit diagram of the pulse signal amplifier and standardization circuit forming part of FIG. 1.

Referring to FIG. 3, there is shown, by way of example, a complete wiring diagram of the amplifier 12 and pulse standardization circuit 13, comprising an input circuit 40 including a capacitative transducer 44, a transistor amplifier 41, a D.C. restorer 42 and a pulse standardization circuit 43 shown in the form of a monostable transistor multivibrator circuit.

The input circuit 40 shown by way of example comprises the capacitive pulse pickup or detector 44 connected in series with a high-voltage D.C. source 45, such as a dry battery, and a load resistor 46, to produce pulse signal potentials $q$, FIG. 2B, for impression upon the input of the amplifier 41. The latter may comprise a pair of current-coupled grounded collector operated transistor stages T$r$1 and T$r$2 providing an impedance transformer for matching the relatively high input impedance of the transducer 44 with the amplifier input. The amplifier is shown to comprise a pair of conventional transistor stages T$r$3 and T$r$4 connected and operated in grounded emitter configuration. Stage T$r$5 is a further grounded collector impedance matching stage followed by an output or power stage T$r$6. The amplified pulse signals $q$ may be passed through a D.C. restorer 42 to minimize the effect of the dichrotic notch Z, FIG. 2A, on the pulse signals $q$. Practically, this will be required in a few limited cases only due to the function of the multivibrator or equivalent pulse standardization circuit 13 in converting the pulse signals $q$ into standard pulses L of constant width and amplitude. The pulse standardization circuit 43 is comprised, in the example illustrated, of a monostable transistor multivibrator of known design, comprising an input transistor T$r$7 capacitatively coupled with the output of the D.C. restorer 42, or capacitively coupled with the output of the amplifier 41 if the D.C. restorer 42 is omitted, and including a second transistor T$r$8 being R-C coupled with the transistor T$r$7 through a feedback resistor 47, and feedback capacitor 48. The emitters of the transistors T$r$7 and T$r$8 are connected through the parallel combination of a resistance and capacitance to the negative supply source. By making either the resistor 47 or capacitor 48 adjustable, the length of the output pulses L may be controlled, in a manner well known and understood. The output pulses may serve to energize the winding of the solenoid 14 either directly or through a further amplifier or relay 49, as shown in the drawing.

In FIG. 1, there is further shown an indicator or pressure gauge 36 connected to the cuff or feeding line 15 for direct continuous reading of the systolic blood pressure represented by the points O, FIG. 2C. Alternatively or additionally, the pressure may be recorded by a suitable recorder 39 directly calibrated in units of pressure such as mm. Hg, as indicated in the drawing.

Instead of indicating or recording the fluctuations C of the cuff pressure, the same may be suppressed or smoothened by means of a pneumatic filter which may consist of a constriction 37 of the feed line to the gauge 36 followed by a chamber or cavity 38 connected to said line, in the manner shown in FIG. 1, and representing the equivalent of a series resistance and parallel capacitor of a low-pass electrical filter. Alternatively, by the provision of a suitable transducer, such as of the type described in the above-mentioned patent, the pneumatic fluctuations may be converted into electrical variations which, after passage through a suitable electrical low-pass or smoothing filter, are applied to an electrical indicator or recorder calibrated in blood pressure units, in a manner readily understood. While the suppression of the cuff pressure fluctuations may result in a steady and more accurate blood pressure indication, such a method of operation exhibits a reduced following accuracy where rapid and substantial blood pressure variations may be expected. The invention makes it possible to use either method or mode of operation, to suit existing conditions and operating requirements, thus greatly increasing its flexibility and usefulness in practice.

Figure 4:
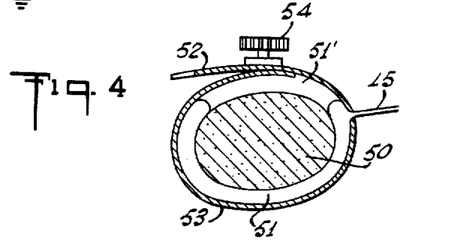
FIG. 4 shows an improved occluding cuff construction according to the invention.

FIG. 4 illustrates a preferred occluding cuff construction which has been found to prevent injury or discomfort to the patient even after application to the finger or any other limb during prolonged periods, whereby to enable full utilization of the benefits of the continuous blood pressure monitoring or measurement in accordance with the invention. It will be noted that the finger 50 is only partially occluded by the cuff or bag 51, there being a free space 51' left preferably on the upper side of the digit. In this way, the cuff, being connected to the pressure line 15, may be left applied for at least one hour and longer without danger to the patient. The cuff, which may be adjustable in diameter to accommodate variously sized fingers, is set by locking the projecting end 52 of a metal band or strap 53, to which the cuff or bag 52 may be cemented, by means of a thumb or setscrew 54, or in any other suitable manner.

In the foregoing, the invention has been described in reference to the continuous indication and/or recording of the systolic blood pressure by the use of a transducer or detector responsive to the peripheral pulse or arterial volume changes resulting from the heart beats of a human or animal organism. Alternatively, the system of the invention may be simply converted or modified to indicate the diastolic blood pressure by the provision of a suitable transducer or detector, such as a capacitive transducer of the type referred to, being responsive to the so-called Korotkoff or arterial sounds or vibrations which occur at cuff pressures equal to blood pressures between the diastolic and systolic blood pressure.

For this purpose, the detector may be arranged closely to the cuff so as to be substantially non-responsive to the pulse waves or amplitude changes due to the systolic pressure variations, but enabling a ready detection of the Korotkoff sounds or arterial vibrations. Alternatively or additionally, the pulse waves may be suppressed by a suitable high-pass filter designed to freely pass the Korotkoff sounds or frequencies. The latter, being indicated at s in FIG. 2A, comprises a frequency band of from about 60 to 200 cycles per second, while the intra-arterial pressure pulses p encompass only a band width of from 3 to about 10 cycles per second. As a consequence, the provision of a suitable electrical band-pass filter between the detector 11 and the amplifier 12, suppressing the pulse signals produced as a result of the intra-arterial pressure pulses p but freely passing the arterial or Korotkoff sounds or signals, and by a simple modification of the system, as shown by FIGS. 6 and 7, the invention may be utilized for the indication and/or recording the diastolic blood pressure, the control of the cuff pressure fluctuations and function of the system being otherwise substantially the same as in a systolic pressure monitoring system according to FIG. 1.

Figure 6:
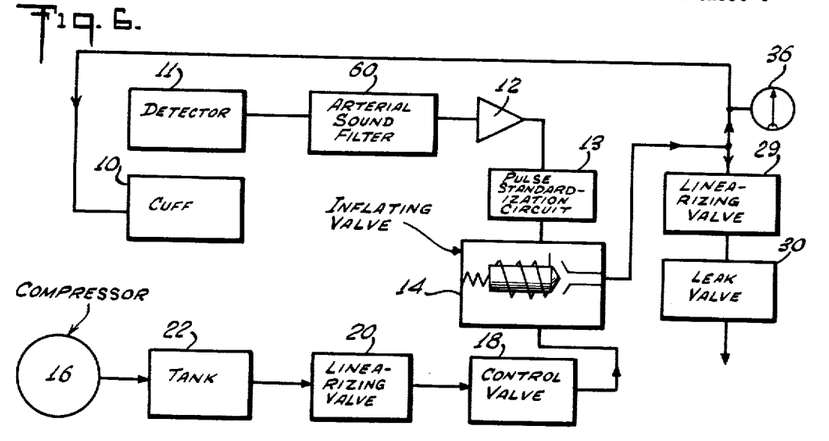
FIGS. 6 and 7 show in block diagram form systems for continuously determining or indicating the diastolic blood pressure in accordance with the invention.

Thus referring to FIG. 6, there is shown an arterial sound filter 60 connected between the detector 11 and the amplifier 12, the system being otherwise identical with FIG. 1 except for the construction of the inflating valve 14 being designed for normal open-circuit operation compared with the closed-circuit operation or design according to FIG. 1. In a system of this type, the cuff pressure rises continuously and substantially linearly due to the normally open inflating valve 14 until reaching or slightly exceeding the diastolic blood pressure. This, in turn, results in the occurrence and detection of a Korotkoff sound signal s which, after amplification is converted into a control pulse L, in substantially the same manner as in case of FIG. 1. As a consequence, the valve 14 will now be closed so as to interrupt the inflation of the cuff, whereby to allow the cuff pressure to decrease to a point below the systolic pressure by the action of the leak or escape valve 30. Again, the cuff pressure is thus caused to periodically fluctuate above and below the diastolic blood pressure, in substantially the same manner as in the case of the systolic indicator of FIG. 1.

Figure 7:
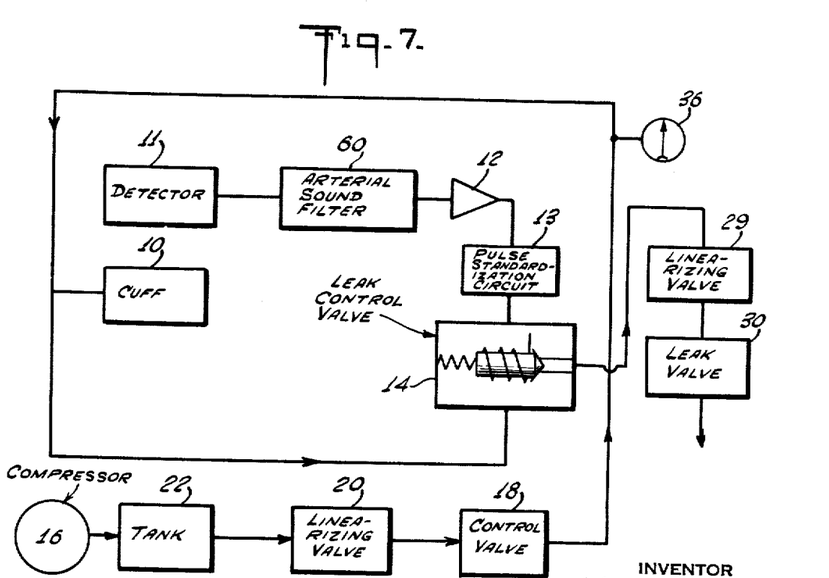

According to a modified arrangement as shown in FIG. 7, the valve 14 is operated in the normally closed-circuit mode, the same as in FIG. 1, but with the cuff being directly or permanently connected to the pressure source 16 through the buffer 22, the linearizing valve 20 and the control valve 18 and with the escape valve 30 being connected to the cuff intermittently by way of the valve 14 controlled by the Korotkoff or arterial sound signals. As a result, the cuff pressure again increases to a value above the diastolic blood pressure, to cause the production of a control pulse L by the Korotkoff sound signals and opening of the valve 14. This, in turn, will allow sufficient air or the like to escape through the leak valve 30, whereby to reduce the cuff pressure to a point below the diastolic blood pressure and to result in a renewed inflation of the cuff, in a manner readily understood. Thus, the cuff pressure is again caused to fluctuate above and below the diastolic blood pressure as a result of the intermittent control of the leak valve 30 by the valve 14 operated in response to the Korotkoff or arterial sound signals.

Figure 5:
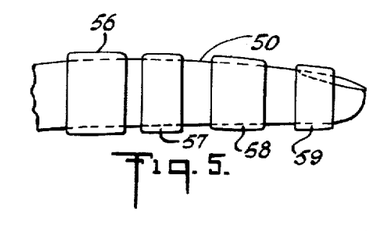
FIG. 5 illustrates a method and arrangement for simultaneously indicating systolic and diastolic blood pressure by means of a multiple cuff and pick-up applied to the same limb or extremity.

FIG. 5 shows an arrangement for and method of continuously measuring or indicating both systolic and diastolic blood pressure from a single finger 50, or any other limb, by the use of two occluding cuffs 56 and 58 and cooperating detectors 57 and 59, respectively. More specifically, the cuff 56 most proximal is the diastolic occluding cuff being followed by the diastolic pickup or transducer 57 distal to the cuff 56 and being responsive to the Korotkoff or arterial sounds. Then follows the systolic occluding cuff 58 and finally, most distal, the systolic detector 59. As a result, the blood on each pulse or heart beat will reach the systolic cuff 58, even though the diastolic cuff is maintained at diastolic pressure D, FIG. 2A, or as though the diastolic cuff 56 and detector 57 were not present. It is thus possible to indicate simultaneously and continuously both the systolic and diastolic blood pressure, simultaneously by two systems according to the invention or by switching from one to the other mode of operation when using a single system, by the arrangement of the diastolic cuff and detector proximal to and arrangement of the systolic cuff and detector distal to the heart upon the same limb or extremity, in the manner shown by the drawing.

In the foregoing, the invention has been described in reference to a specific illustrative device. It will be evident, however, that variations and modifications, as well as the substitution of equivalent parts and elements for those shown may be made without departing from the broader scope and spirit of the invention, as set forth in the appended claims. The specification and drawings are accordingly to be regarded in an illustrative rather than in a restrictive sense.

I claim:

1. A system for continuously indicating and/or recording the blood pressure of a human or animal organism, comprising an occluding cuff adapted for application to an extremity to control the flow of blood therethrough, a source of compressed fluid connected to said cuff to inflate the same, a detector adapted for application to the same extremity at a point distal to said cuff to produce electric pulse signals subject to the occlusion by said cuff, amplifying and pulse standardization means to convert said pulse signals into control pulses of substantially constant width and amplitude, electrically actuatable inflating valve means between said source and said cuff operated by said control pulses, leak valve means connected to said cuff to cause a continuous decrease of the cuff pressure, whereby to effect periodic cuff pressure fluctuations above and below the blood pressure being determined, and means to maintain substantially constant predetermined rates of rise and fall of said cuff pressure fluctuations.

2. A system as claimed in claim 1, said last means being comprised of a pair of constant flow control valves connected between said cuff and said source and between said cuff and said leak valve means, respectively.

3. A system for continuously indicating and/or recording the blood pressure of a human or animal organism comprising a pressure cuff adapted for application to an extremity to occlude the flow of blood therethrough a source of compressed fluid connected to said cuff to inflate the same, a detector adapted for application to the same extremity at a point distal to said cuff to produce electric pulse signals subject to the occlusion by said cuff, amplifying and pulse standardization means to convert said pulse signals into control pulses of substantially constant width and amplitude, electrically actuatable valve means between said cuff and said source operated by said control pulses, a leak valve connected to said cuff to effect a continuous decrease of the cuff pressure, whereby to cause periodic cuff pressure fluctuations above and below the blood pressure being determined, a first constant flow control valve connected between said source and said cuff, and a second constant flow control valve connected between said cuff and said leak valve, and independent means for adjusting the flow rate of said first and second constant flow control valves, respectively.

4. In a system as claimed in claim 3, both said constant flow control valves comprising a bellows connected to the output pressure side of the valves and a flexible tube engaged by said bellows to control the fluid flow therethrough, and said first flow control valve being arranged in a confined space connected to said cuff.

5. In a system as claimed in claim 4, said pulse standardization means being comprised of a monostable multivibrator circuit including means to control the width of the output pulses produced thereby.

6. A system for continuously indicating and/or recording the systolic blood pressure of a human or animal organism comprising an occluding cuff adapted for application to an extremity to control the arterial blood flow, a source of compressed fluid connected to said cuff to inflate the same, a transducer adapted for application to the same extremity at a point distal to said cuff to produce periodic electric signals by the arterial pulse volume changes upon the cuff pressure decreasing below the systolic blood pressure, amplifying and pulse standardization means connected to said transducer to convert said signals into control pulses of substantially constant amplitude and duration, an electromagnetic inflating valve connected between said source and said cuff operated in the normally closed mode by said control pulses, a leak valve connected to said cuff to cause a continuous decrease of the cuff pressure, whereby to effect periodic cuff pressure fluctuations above and below the systolic blood pressure being determined, a pair of constant flow valves connected, respectively, between said cuff and said source and between said cuff and said leak valve, and cuff pressure translating means to indicate the systolic blood pressure being determined.

7. A system for continuously indicating and/or recording the diastolic blood pressure of a human or animal organism comprising an occluding cuff adapted for application to an extremity to control the arterial blood flow, a source of compressed fluid connected to said cuff to inflate the same, a transducer adapted for application to the same extremity at a point distal to said cuff to produce periodic electric signals by the arterial sound vibrations upon the cuff pressure exceeding the diastolic blood pressure, amplifying and pulse standardization means connected to said transducer to convert said signals into control pulses of substantially constant amplitude and duration, an electromagnetic inflating valve between said source and said cuff operated in the normally open mode by said control pulses, a leak valve connected to said cuff to cause a continuous decrease of the cuff pressure, whereby to effect periodic cuff pressure fluctuations above and below the diastolic blood pressure being determined, a pair of constant flow control valves connected, respectively, between said cuff and said source and between said cuff and said leak valve, and cuff pressure translating means to indicate the diastolic blood pressure being determined.

8. A system as claimed in claim 7, including filter means connected between said transducer and said amplifying means to suppress the pulse waves while freely passing the arterial sound signals.

9. A system for continuously indicating and/or recording the diastolic blood pressure of a human or animal organism comprising an occluding cuff adapted for application to an extremity to control the arterial blood flow, a source of compressed fluid connected to said cuff to inflate the same, a transducer adapted for application to the same extremity at a point distal to said cuff to produce periodic electric signals by the arterial sound vibrations upon the cuff pressure exceeding the diastolic blood pressure being determined, amplifying and pulse standardization means connected to said transducer to convert said signals into control pulses of substantially constant amplitude and duration, a leak valve connected to said cuff to cause a continuous decrease of the cuff pressure, and an electomagnetic control valve connected between said cuff and said leak valve operated in the normally closed mode by said control pulses, whereby to effect periodic cuff pressure fluctuations above and below the diastolic blood pressure being determined, a pair of constant flow control valves connected, respectively, between said cuff and said source and between said cuff and said leak valve, and cuff pressure translating means to indicate the diastolic blood pressure being determined.

10. A system as claimed in claim 9 including filter means connected between said transducer and said amplifying means to suppress the pulse waves while freely passing the arterial sound signals.

(References on following page)

References Cited in the file of this patent

UNITED STATES PATENTS

| | | | |
|---|---|---|---|
| 2,714,379 | Raines | Aug. 2, | 1955 |
| 2,811,964 | Boucke | Nov. 5, | 1955 |
| 2,756,741 | Campanella | July 31, | 1956 |
| 2,815,748 | Boucke | Dec. 10, | 1957 |
| 2,826,191 | Burns | Mar. 11, | 1958 |
| 2,851,030 | Boucke | Sept. 9, | 1958 |
| 2,875,750 | Boucke et al. | Mar. 3, | 1959 |
| 2,952,253 | Seligman | Sept. 13, | 1960 |

UNITED STATES PATENT OFFICE
CERTIFICATE OF CORRECTION

Patent No. 3,104,661

September 24, 1963

William Halpern

It is hereby certified that error appears in the above numbered patent requiring correction and that the said Letters Patent should read as corrected below.

Column 4, line 39, for "he" read -- the --; column 5, line 66, for "pulse intra-arterial pressure" read -- intra-arterial pressure pulse --; line 71, for "pulses" read -- pulse --; column 8, line 2, for "comprises" read -- comprise --; line 41, after "cuff" insert -- 10 --; same column 8, line 47, for "ingreases" read -- increases --; column 9, line 44, after "therethrough" insert a comma.

Signed and sealed this 14th day of April 1964.

(SEAL)
Attest:
ERNEST W. SWIDER

Attesting Officer

EDWARD J. BRENNER

Commissioner of Patents